Dec. 26, 1961   G. A. LEBERT ETAL   3,014,978
COMPONENT HOLDER
Filed Sept. 4, 1958
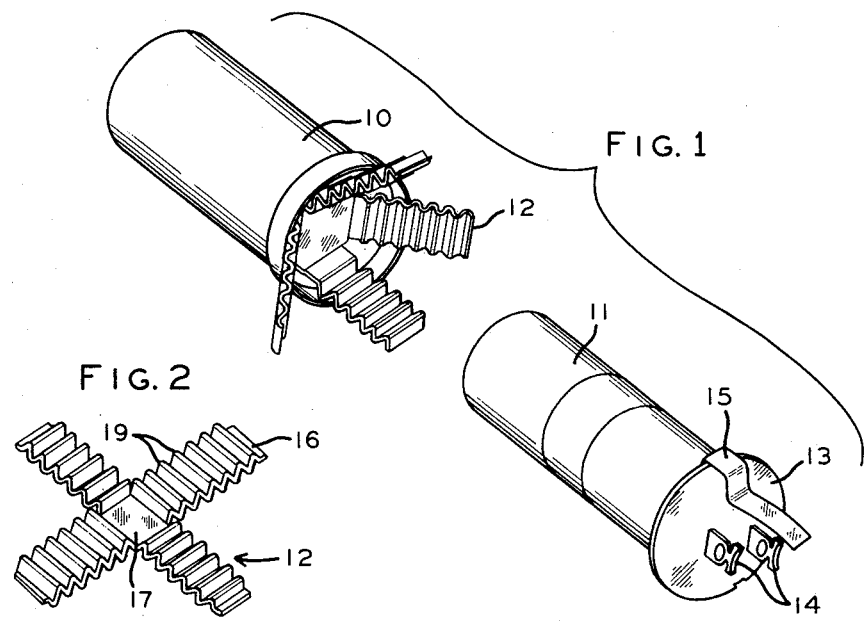
FIG. 1
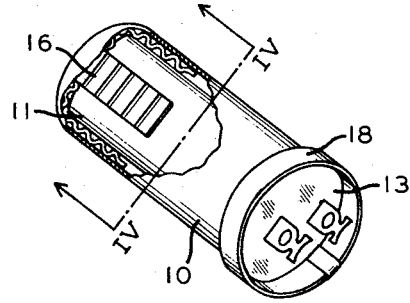
FIG. 2
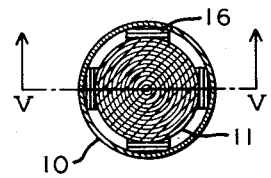
FIG. 3
FIG. 4
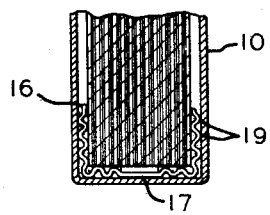
FIG. 5
INVENTORS
GERALD A. LEBERT
NORMAN D. SCHULZE
BY Connolly and Hutz
ATTORNEYS United States Patent Office 3,014,978
Patented Dec. 26, 1961

3,014,978
COMPONENT HOLDER
Gerald A. Lebert and Norman D. Schulze, North Adams, Mass., assignors to Sprague Electric Company, North Adams, Mass., a corporation of Massachusetts
Filed Sept. 4, 1958, Ser. No. 759,055
1 Claim. (Cl. 174—52)

This invention relates to an electrical component contained in a casing and more particularly to an electrical component supported in the casing spaced away from the inner wall surface.

An active capacitor section is held in a casing by means which join the parts together so that they are not separable. Such joined together casing and capacitor section in forming a complete product should have a secure structural interconnection. It is important that a means be provided which will permit the connection between the capacitance section and the casing to protect the electrical characteristics of the section and avoid damage or separation of the parts. It is not feasible to provide a casing which tightly grips the section for it is necessary to provide some spacing between the casing and the section. While the spacing can be sealed with a wax or some other material, a filler compound which is poured into the casing around the section has deficiencies. The device which holds the section in the casing, however, is preferably of a nature which will insulate the section from physical shocks applied to the casing and will also center the section in the casing.

It is an object of this invention to provide a support cushion or mounting which spaces the component from the casing.

It is a further object of this invention to provide a combination of capacitance section, a casing, and a resilient mounting positioned between the section and the casing serving to protect the section in the casing.

It is still another object of this invention to provide a device for supporting an electrical component.

These and other objects of this invention will become more apparent upon consideration of the following description taken together with the accompanying drawings in which:

FIGURE 1 is an exploded perspective view of the construction of this invention;

FIGURE 2 is a perspective view of the supporting and centering device of the construction of FIGURE 1;

FIGURE 3 is a perspective view of a capacitor having the construction of this invention with the casing partially broken away;

FIGURE 4 is a radial section of the capacitor of FIGURE 3 taken on lines IV—IV of FIGURE 3 in the direction of the arrows.

FIGURE 5 is an axial section of the end of the capacitor of FIGURE 3 taken on lines V—V of FIGURE 4 in the direction of the arrows.

In this invention an electrical component is contained in a casing which holds, supports and protects the component.

In general, this invention provides a centering and cushioning device made up of four arms extending from a central body. The four arms are corrugated to provide an undulating structure. The crests of the corrugation are oriented normal to the length of the arms and provide a succession of cross surfaces. The device is made up of a flexible non-elastic material which retains the corrugated shape under heat and pressure.

This invention is applicable to supporting fragile electrical components in an encasing structure such as a metal container. Certain electrical components need careful handling. The active sections of capacitors are such components and this invention is particularly adaptable to the relatively fragile active section of dry electrolytic capacitors.

Referring to FIGURE 1 there is shown a capacitor construction made up of a casing 10 and a section 11. The casing 10 has inserted in its open end a cushion 12. Section 11 which is dimensional to fit into the casing 10 is shown in position to slide into the casing 10. The assembled parts form a capacitor.

The assembled capacitor which is composed of the section 11 carrying a mounting plate 13 from which extends an array of capacitor structure terminals 14. The section 11 also carries a cathode tab 15. Terminals 14 and the tab 15 are connected to electrodes in the section 11 and compose the means for electrical connection of the capacitor. The electrodes and dielectric of the section 11 may be any useful capacitor arrangement.

The terminals 14 extend through the plate 13 which is attached to the outer end of the section 11. The tab 15 fits around the side of the plate 13 and as shown in FIGURE 1 presents a length of free end. The cushion 12 has arms 16 radiating from a central body 17. In FIGURE 1 the four arms 16 are shown in a folded semi-contracted position on partial insertion into the casing 10. The plate 13 is adapted to fit into a ring 18 formed at the open end of the casing 10.

The cushion 12 as shown in FIGURE 2 has four quadrant arms 16 extending from the central portion 17. The arms 16 are of substantially greater length than the side dimension of the square central portion 17. The arms 16 are formed with laterally extending undulations which in the form of a disclosed embodiment are corrugations 19. These corrugations 19 extend up and down across the plane of the central portion 17. The cushion 12 is composed of a durable, flexible but relatively non-elastic plastic material such as polyethylene. The corrugations 19 in the cushion 12 are pliable and flexible but relatively non-elastic so that they may be incorporated in the finished structure without elongation. The corrugations are normal to the length of the arms 16 and provide two sets of crest surfaces, one on one side of the cushion 12 and one on the other side of the cushion 12.

The parts are assembled into a capacitor by bringing the section 11 into the casing 10 with the cushion 12 draped over the entering end of the section 11.

The completed assembly of the section 11 into the casing 10 is illustrated in FIGURE 3 wherein the section 11 is inserted into the casing 10 to the point containing the plate 13 within the ring 18. The cushion 12 clutches the end of the section 11 so that each of the arms 16 extend down the side of the section 11 and is interpositioned between the inner wall of the casing 10 and the outer surface of the section 11.

The section 11 as shown in FIGURE 3 is inserted fully into the casing 10 so that each of the four arms 16 are folded at right angles to extend substantially along the side surface of the section 11. These axially extending portions of the arms 16 are disposed at the four quadrants of the cylindrical section 11. Thus there are provided two sets of pairs of diametrically positioned arms 16. The arms are sandwiched between the outer surface of the section 11 and the inner surface of the casing 10 as illustrated by the radial section of FIGURE 4. Considering the arms 16 in pairs it is seen that an arm at the top and an arm at the bottom of the section 11 may be considered as diametrically positioned while the two arms at the sides of the section 11 may be considered as diametrically positioned. This disposition referring to the arrangement as shown in FIGURE 4.

The end of the section 11 inserted into the casing 10 and seating against the central body 17 at the end of the casing 10 results in sandwiching the central body 17 and the portions of the arms 16 adjacent the central body 17 against the circular end of the casing 10. Thus the cushion 12 as a whole is pinned against the end of the casing 10 with substantial portions of its arms 16 extending around the sides of the section 11 and consequently grasping the end of the section 11. The corrugations 19 are formed so that the crests are circumferentially disposed with respect to the section 11 and the inclined surfaces of the corrugations 19 cut the radial plane of the section 11. Thus it may be generalized that the depth dimension of the corrugations 19 is radial to the section 11 in the portion of the arms 16 extending along the side of section 11. At the same time the section of the arms sandwiched between the end of the casing 10 and the section 11 have a depth dimension which is axial to the section 11.

In operation the assembled component containing the section 11 abutting against the cushion 12 within the casing 10 acts to cause the cushion to work with a grasping action on the end of the section 11. The flexibility and non-elasticity of the plastic material of the cushion 12 assists this grasping action. The grasp of the cushion 12 on the end of the section 11 serves to preserve the relationship between the parts in a number of ways. It will be seen that since the flattening of the corrugations 19 on one side leads to a compression of the undulations rather than an elongation of the arms the pressure of the crushed arm gripping the section 11 is such as to inhibit relative motion of the parts. In effect the crushed arm grips and anchors the section 11 even though it may be encased in a slippery wax coating. The cushion is so arranged within the casing 10 and on the end of section 11 so that any dislodgement of the relative alignment of the parts of necessity causes a gripping compression of one of the arms and this gripping compression serves to prevent a permanent relative shift between the parts.

Other advantages of this invention are seen in that the capacitance section 11 is centered in the casing 10. In its position in the casing 10 the capacitance section 11 is allowed to float and adapt to whatever configuration the waxed surface of the section 11 and the capacitance provide. Further, the cushion 12 is under no tension due to elasticity. The compression on the corrugations 19 will not bring permanent distortion to the cushioning materials. Even after a period of use the cushion 12 retains its original characteristics.

Among the advantages of this invention is ease of assembly of the component containing the construction of the invention. The casing 10 and the section 11 are independently prepared and formed into the state of completion shown at FIGURE 1. At this point of construction the two parts are brought together. The cushion 12 is also independently formed and in the assembly operation is positioned with the center body 17 inserted in the open end of the casing 10. The section 11 is then ready for insertion into the casing 10. The casing 10 and the section 11 are slid together capturing between them the cushion 12. The final assembled result is illustrated in FIGURES 3, 4 and 5.

This assembly method is an advance over prior known methods. Further the resultant assembly is an advance over prior known assemblies. The capacitance section 11 is centered and secured in the casing. The cushion 12 slides into the casing all of the way to the end wall where it abuts the inner surface of the end of the casing 10 sandwiched between the casing 10 and the capacitance section 11. In this position the cushion 12 draped around the section 11 as described above allows the end of the section 11 to float and adapt to whatever configuration the reactive surface of the section 11 and the casing 10 provide. The cushion 12 is under no tension. The compression on the corrugations 19 do not bring about permanent dimension.

The non-elastic plastic material in the above embodiment is polyethylene. Polyethylene of a molecular weight providing the soft and flexible characteristics to the cushion has other desirable properties for the purpose of this invention. For example, it is non-adsorbent and relatively chemically inert. It will be understood that similar plastic materials may be employed in the device of this invention. For example, polymerized trifluorochloroethylene of a molecular weight to provide the cushion with the soft and flexible characteristics will be suitable. The polytrifluorochloroethylene is even more inert than the polyethylene.

Numerous other variations and modifications in the preferred embodiment described above will be readily apparent and may be made without departing from the spirit of this invention. Having described the invention in its preferred embodiment and illustrating its use and effectiveness the scope of the invention is defined in the following claim.

What is claimed is:

An electrical capacitor comprising an external can having a closed end, an active capacitance section of electrodes and dielectrics, a flexible inert plastic mounting cushion having a plurality of spaced arms having corrugated surfaces and extending from a central body portion, said capacitance section mounted in said can with said cushion compressed therebetween, whereby said arms grip the curved surface of said section and said body portion provides a seat for an end of said section at said closed end of said can.

References Cited in the file of this patent

UNITED STATES PATENTS

| | | |
|---|---|---|
| 719,612 | Russell | Feb. 3, 1903 |
| 1,395,281 | Koretzky | Nov. 1, 1921 |
| 1,511,935 | Bayles et al. | Oct. 14, 1924 |
| 1,685,766 | Mosher | Sept. 25, 1928 |
| 1,808,410 | Heise et al. | June 2, 1931 |
| 1,888,855 | Fuller | Nov. 22, 1932 |
| 2,091,591 | Hartzell | Aug. 31, 1937 |
| 2,129,000 | Given | Sept. 6, 1938 |
| 2,287,114 | McEachron | June 23, 1942 |
| 2,400,576 | Sigmund et al. | May 21, 1946 |
| 2,758,259 | Peck | Aug. 7, 1956 |
| 2,773,928 | Del Camp | Dec. 11, 1956 |
| 2,782,977 | Thompson | Feb. 26, 1957 |
| 2,863,595 | Emery | Dec. 9, 1958 |

FOREIGN PATENTS

| | | |
|---|---|---|
| 567,426 | Great Britain | Feb. 14, 1945 |